(12) United States Patent
Otsuka

(10) Patent No.: US 12,255,522 B2
(45) Date of Patent: Mar. 18, 2025

(54) MOTOR

(71) Applicant: MINEBEA MITSUMI Inc., Nagano (JP)

(72) Inventor: Makoto Otsuka, Nagano (JP)

(73) Assignee: MINEBEA MITSUMI Inc., Nagano (JP)

(*) Notice: Subject to any disclaimer, the term of this patent is extended or adjusted under 35 U.S.C. 154(b) by 204 days.

(21) Appl. No.: 17/932,042

(22) Filed: Sep. 14, 2022

(65) Prior Publication Data

US 2023/0107866 A1 Apr. 6, 2023

(30) Foreign Application Priority Data

Oct. 1, 2021 (JP) .................... 2021-163008

(51) Int. Cl.
*H02K 9/22* (2006.01)
*H02K 9/06* (2006.01)

(52) U.S. Cl.
CPC ............. *H02K 9/227* (2021.01); *H02K 9/06* (2013.01)

(58) Field of Classification Search
CPC ................................ H02K 9/227; H02K 9/06
See application file for complete search history.

(56) References Cited

U.S. PATENT DOCUMENTS

| | | | | |
|---|---|---|---|---|
| 6,568,193 B1* | 5/2003 | Cahill | ............... | F25B 21/02 62/331 |
| 2005/0116554 A1* | 6/2005 | Dano | ............... | F04D 25/064 310/58 |
| 2006/0066161 A1* | 3/2006 | Matsumoto | ............ | H02K 7/085 310/67 R |
| 2010/0187922 A1* | 7/2010 | Sheppard | ................ | H02K 3/47 310/59 |
| 2012/0001503 A1* | 1/2012 | Owng | ................... | H02K 9/225 310/54 |
| 2014/0125154 A1* | 5/2014 | Vanderelli | ............ | H02K 19/103 310/46 |
| 2014/0151146 A1* | 6/2014 | Tanaka | ................ | B62D 5/0406 180/443 |
| 2014/0272117 A1* | 9/2014 | Aisenbrey | .......... | H01B 13/0026 427/124 |
| 2016/0149472 A1* | 5/2016 | Pal | ........................ | H02K 9/227 310/64 |
| 2020/0336053 A1* | 10/2020 | Tangudu | ............... | H02K 9/193 |
| 2022/0021276 A1* | 1/2022 | Ramtahal | ................ | H02K 9/02 |
| 2022/0131444 A1* | 4/2022 | Kim | ....................... | H02K 9/223 |
| 2024/0006933 A1* | 1/2024 | Kouda | ................... | H02K 1/187 |

FOREIGN PATENT DOCUMENTS

JP 2018-098862 A 6/2018

* cited by examiner

*Primary Examiner* — Forrest M Phillips
(74) *Attorney, Agent, or Firm* — Chrisman Gallo Tochtrop LLC

(57) ABSTRACT

A motor of the present invention includes a rotation shaft, blades provided at the rotation shaft, a holder having tubular members, a rotor, and a stator opposing the rotor in a radial direction of the rotor. The stator is fixed to the tubular members, the stator includes a magnetic body, a coil and a resin member, a part of the resin member enters into between windings of the coil, another part of the resin member forms a side surface of the stator, and another part of the resin member opposes the blades in an axial direction of the rotation shaft.

9 Claims, 8 Drawing Sheets

MOTOR

CROSS-REFERENCE TO RELATED APPLICATIONS

This application claims benefit of priority to Japanese Patent Application No. JP2021-163008 filed on Oct. 1, 2021. The entire contents of the above-identified application are hereby incorporated by reference.

TECHNICAL FIELD

The present invention relates to a motor.

BACKGROUND ART

Conventionally, in a motor for a drone, a propeller is attached to the upper part of the motor, and a wind produced by the propeller is used to cool the motor body and the interior of the motor. As the motors used in drones, an outer rotor type and an inner rotor type are present.

For example, as an inner rotor type motor, a brushless motor is proposed (for example, see Patent Literature 1). In this brushless motor, a heat-conductive material having thermal conductivity is provided between a coil-winding surface of the stator located inside a case of the motor and the inner surface of an end face part of the case to secure a thermal conduction path from the coil to the case.

CITATION LIST

Patent Literature

Patent Literature 1: JP 2018-98862 A

SUMMARY OF INVENTION

Technical Problem

However, since the brushless motor of Patent Literature 1 has such a structure that the stator and the rotor are wholly covered by the case, heat dissipation efficiency is not sufficient, and an improvement in efficiency may be required in the motor.

An object of the present invention is to provide a motor with an improved heat dissipation efficiency.

Solution to Problem

The above problem is solved by the present invention described below. That is, a motor of the present invention includes a rotation shaft, a blade provided at the rotation shaft, a holder having a tubular member, a rotor, and a stator opposing the rotor in a radial direction of the rotor. The stator is fixed to the tubular member, the stator includes a magnetic body, a coil and a resin member, a part of the resin member enters into between windings of the coil, another part of the resin member forms a side surface of the stator, and another part of the resin member opposes the blade in an axial direction of the rotation shaft.

DESCRIPTION OF EMBODIMENTS

Embodiments of Present Invention

Figure 1:
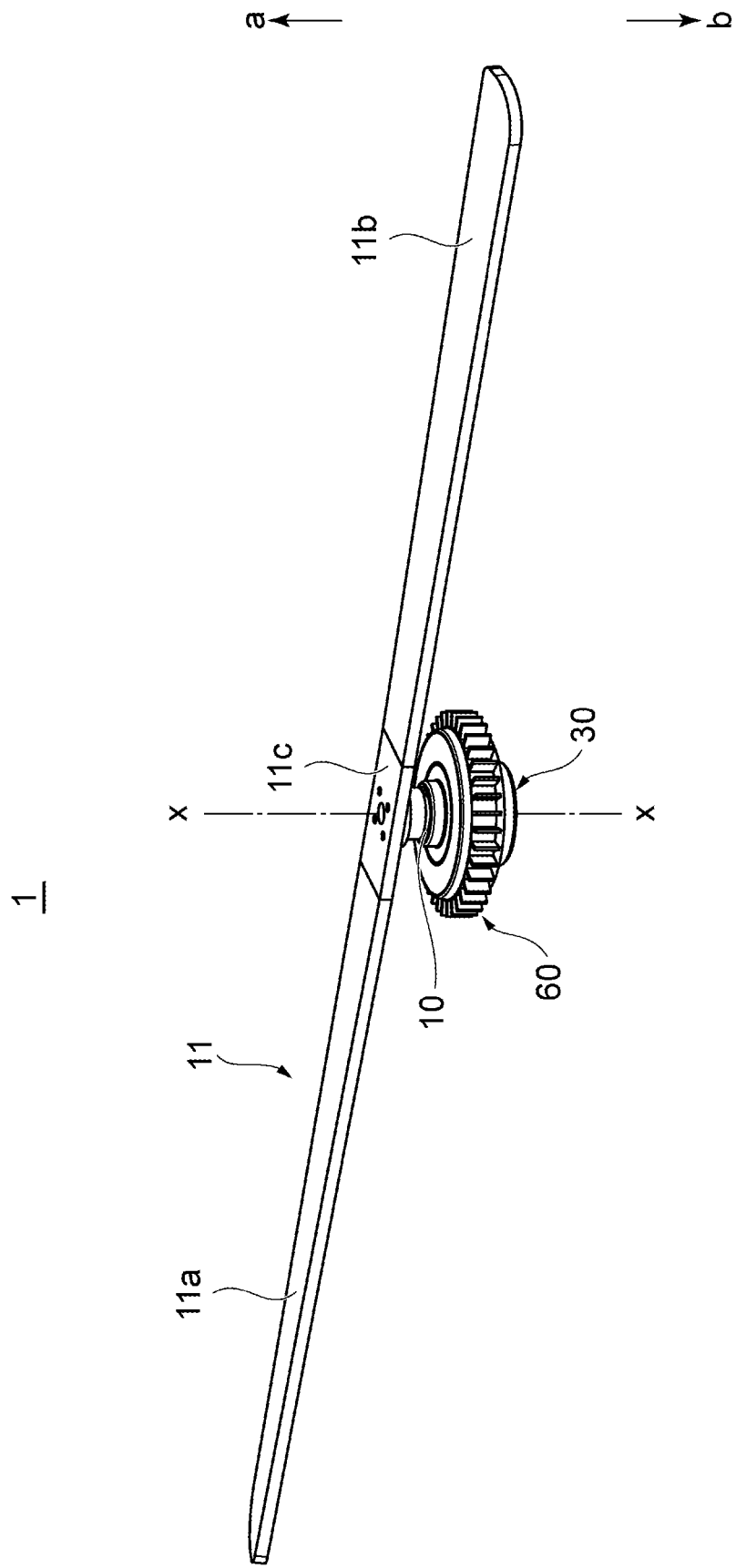
FIG. 1 is a perspective view illustrating an overall configuration of an inner rotor type motor used in a drone according to an embodiment of the present invention.
Figure 2:
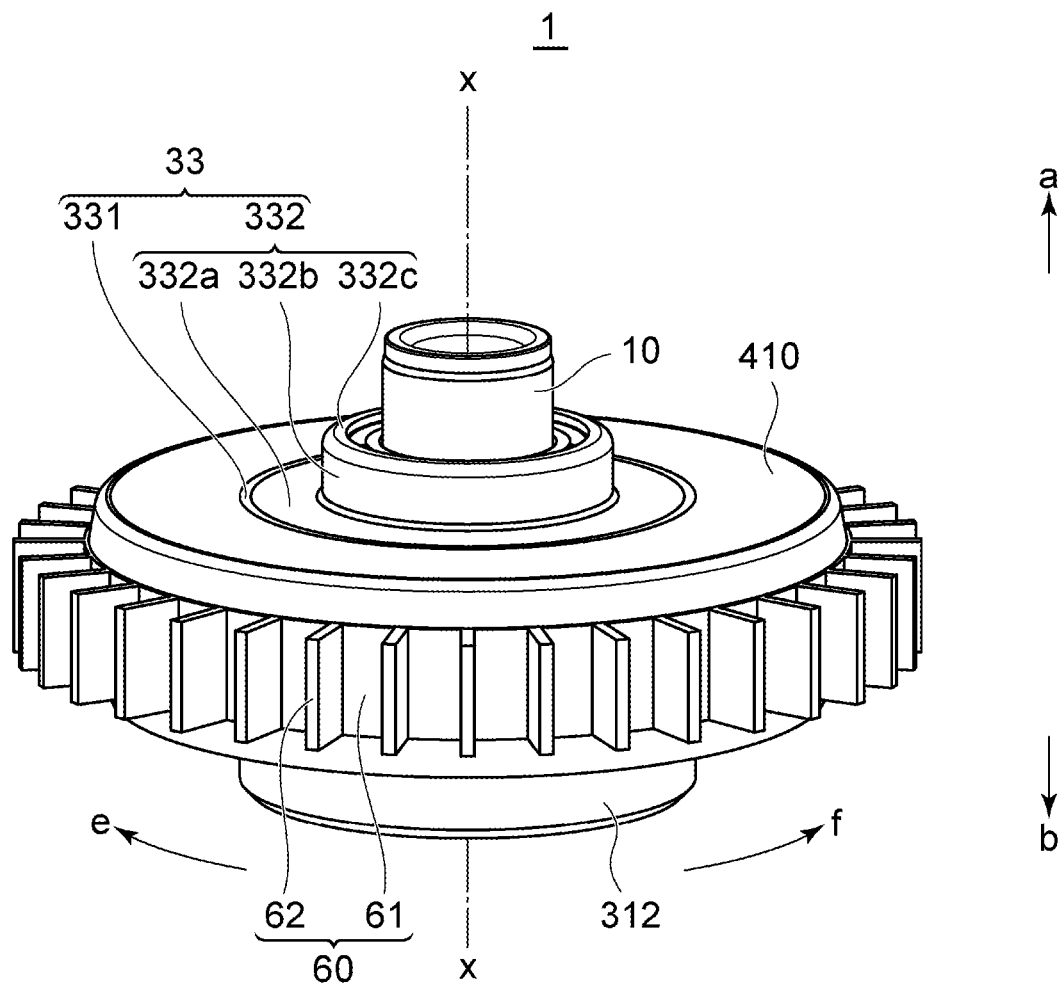
FIG. 2 is a perspective view illustrating a state of a motor with a propeller of a drone detached, according to an embodiment of the present invention.
Figure 3:
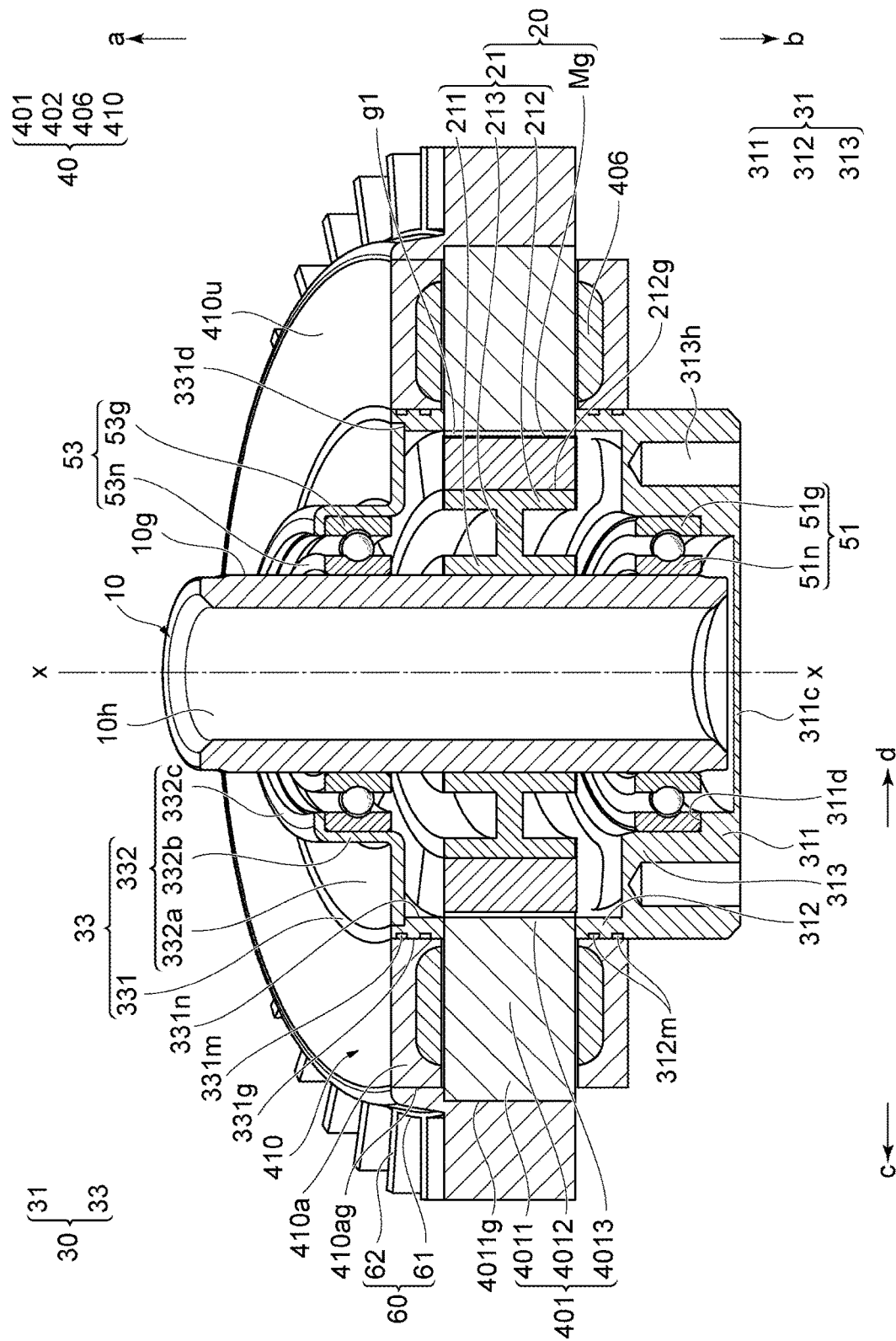
FIG. 3 is a perspective cross-sectional view illustrating an internal structure of a motor according to an embodiment of the present invention.
Figure 4:
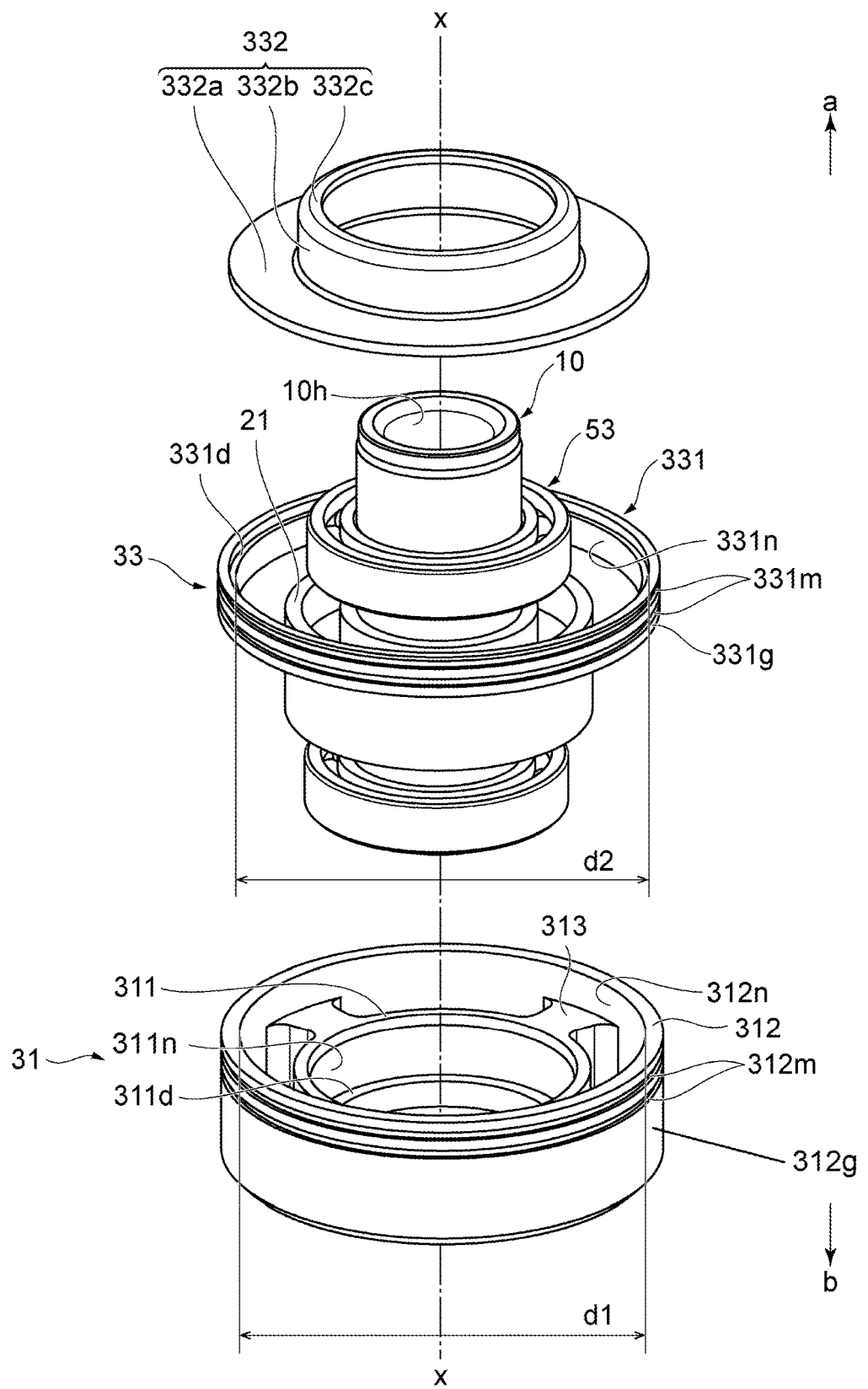
FIG. 4 is a perspective view illustrating a configuration of a holder according to an embodiment of the present invention.
Figure 5:
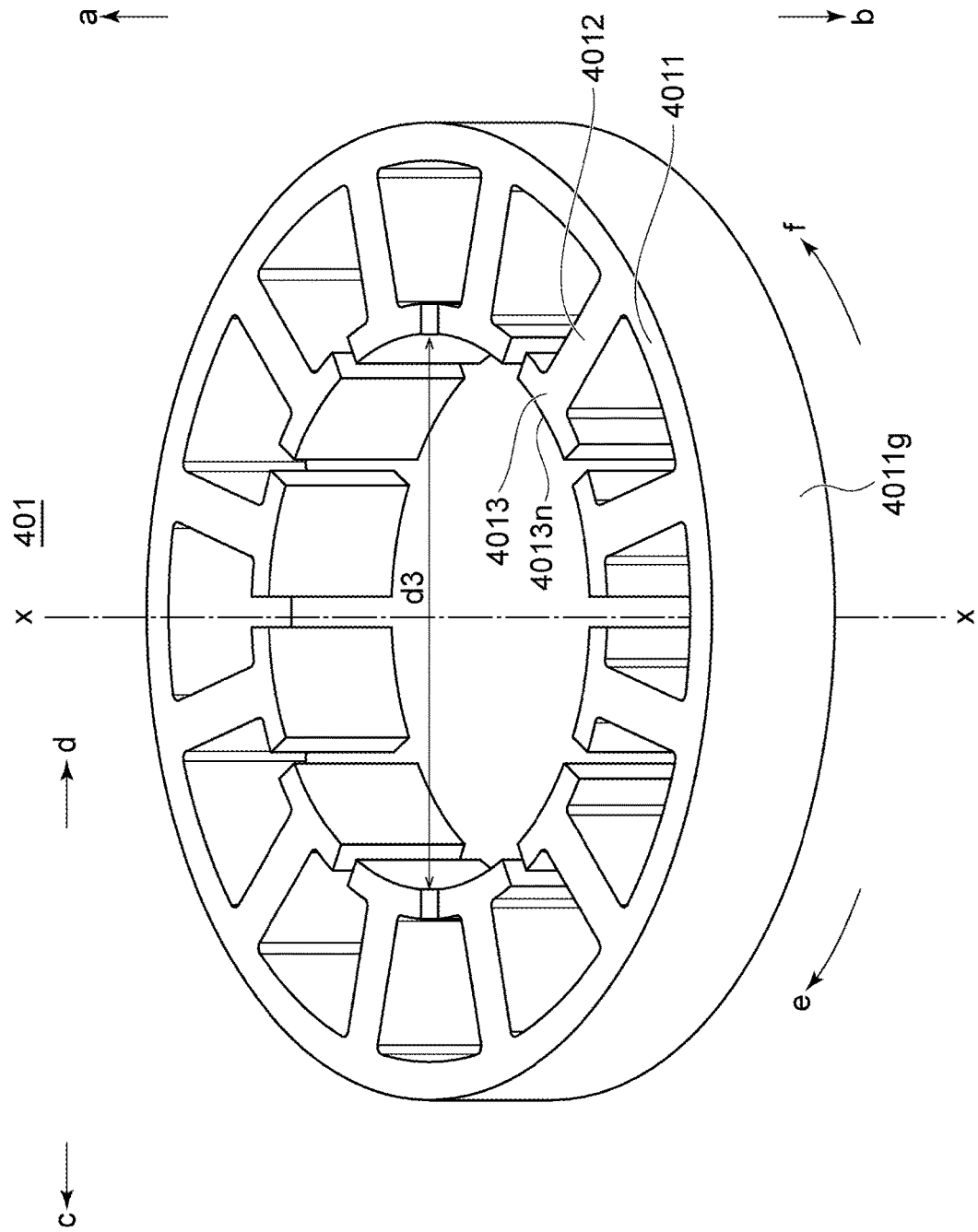
FIG. 5 is a perspective view illustrating a configuration of a stator core according to an embodiment of the present invention.
Figure 6:
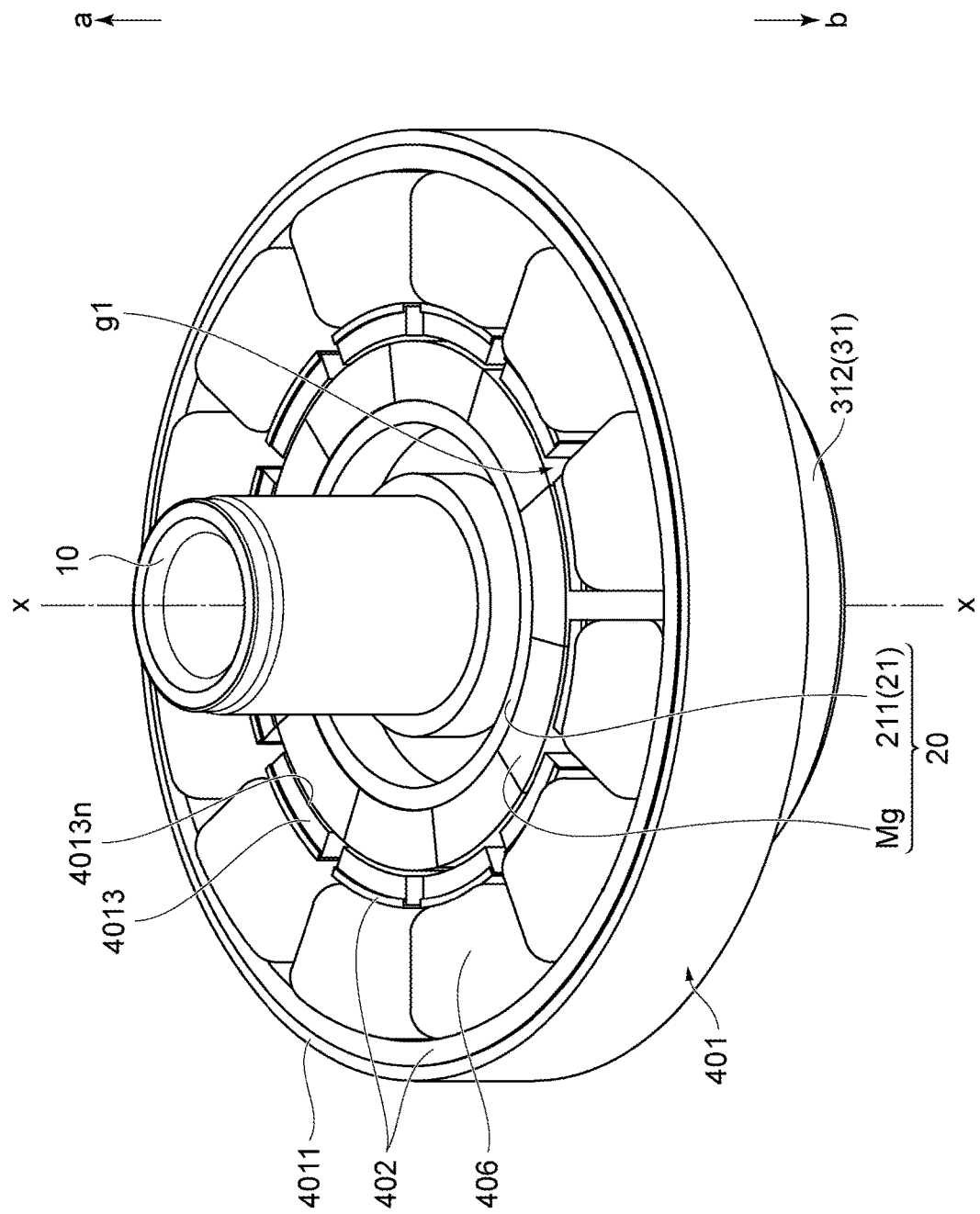
FIG. 6 is a perspective view illustrating arrangement of a stator core, an insulator, a coil, a yoke, and a magnet according to an embodiment of the present invention.
Figure 7:
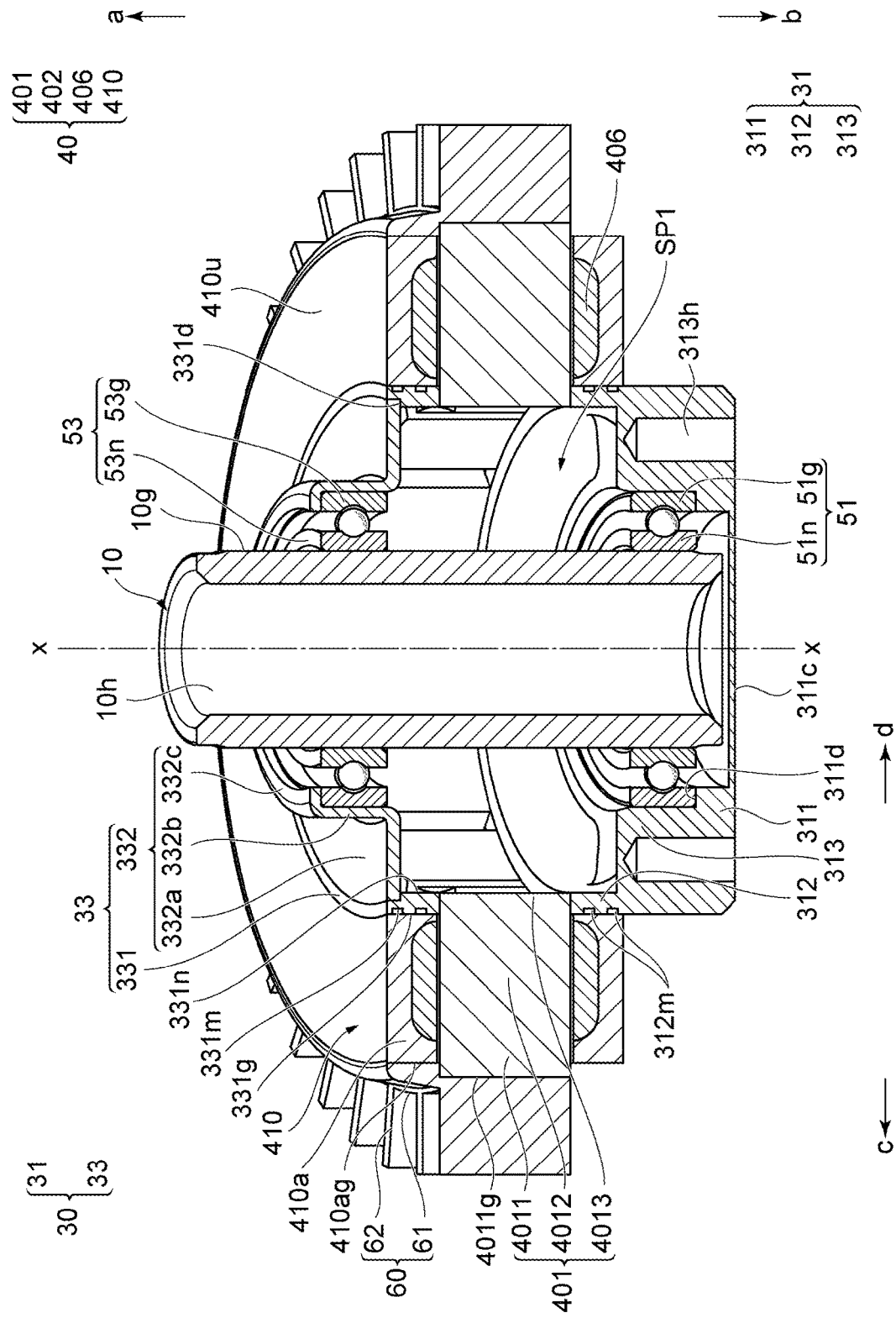
FIG. 7 is a perspective cross-sectional view illustrating a closed space formed at an inner side of a motor according to an embodiment of the present invention.
Figure 8:
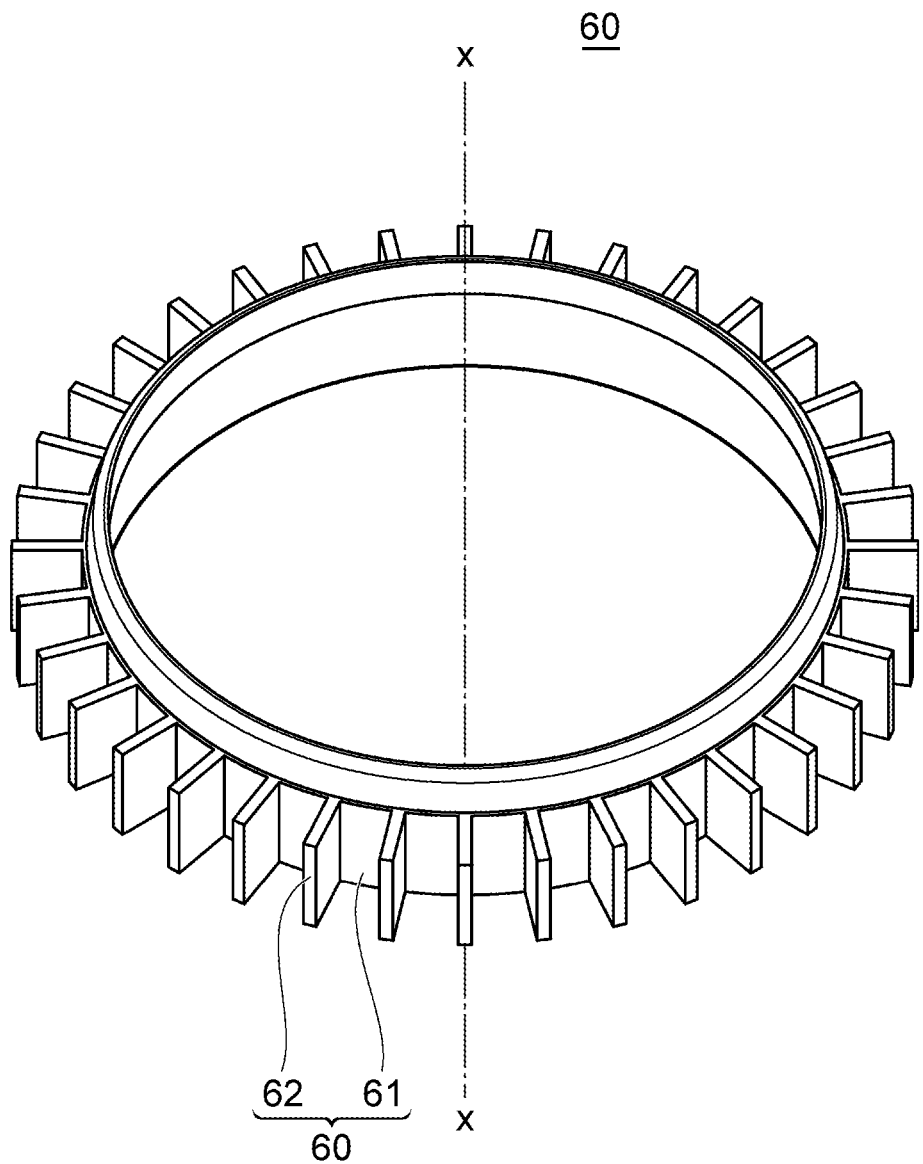
FIG. 8 is a perspective view illustrating a configuration of a heat sink according to an embodiment of the present invention.

Next, embodiments of the present invention will be described with reference to the drawings. FIG. 1 is a perspective view illustrating an overall configuration of an inner rotor type motor used in a drone according to an embodiment of the present invention. FIG. 2 is a perspective view illustrating a state of a motor with a propeller of a drone detached, according to an embodiment of the present invention. FIG. 3 is a perspective cross-sectional view illustrating an internal structure of a motor according to an embodiment of the present invention. FIG. 4 is a perspective view illustrating a configuration of a holder according to an embodiment of the present invention. FIG. 5 is a perspective view illustrating a configuration of a stator core according to an embodiment of the present invention. FIG. 6 is a perspective view illustrating arrangement of a stator core, an insulator, a coil, a yoke, and a magnet according to an embodiment of the present invention. FIG. 7 is a perspective cross-sectional view illustrating a closed space formed at an inner side of a motor according to an embodiment of the present invention. FIG. 8 is a perspective view illustrating a configuration of a heat sink according to an embodiment of the present invention.

In the description of the present embodiment, a direction of an axis X when a motor 1 rotates is referred to as an axial direction or a rotation shaft direction for convenience in the description below. Further, in the following description, for convenience, in the axial direction, an arrow a direction is defined as an upper side or upward side, and an arrow b direction is defined as a lower side or downward side. In a radial direction perpendicular to the axis X, an arrow c direction away from the axis X is defined as an outer peripheral side or an outer side, and an arrow d direction approaching the axis X is defined as an inner peripheral side or an inner side. In a circumferential direction of the motor 1, an arrow e direction in a plan view is defined as a clockwise direction, and an arrow f direction is defined as a counterclockwise direction.

As illustrated in FIGS. 1 to 5, the motor 1 is an inner rotor type brushless motor to be mounted, for example, at a floating moving body such as a drone (not illustrated). As illustrated in FIGS. 1 to 3, the motor 1 includes a rotation shaft 10, a propeller 11 fixed to the rotation shaft 10, a rotor 20, a holder 30 configured to support a bearing, and a stator 40 opposing the rotor 20. The motor 1 is a so-called inner rotor type, where the rotor 20 provided at the inner side of the stator 40, that is, provided at the side of the rotation shaft 10 rotates, and the rotation shaft 10 rotates with the rotor 20.

In the motor 1, the propeller 11 is attached to the rotation shaft 10 protruding toward the upper side (in the arrow a direction), and the propeller 11 rotates integrally with the rotation shaft 10. The propeller 11 includes blades 11a and 11b of a plurality of blades (for example, two blades) centered at a coupling part 11c.

The rotation shaft 10 is formed of a cylindrical member and protrudes upward from a bearing 53 at the upper side by a predetermined distance. The rotation shaft 10 includes a through-hole 10h, and a shaft (not illustrated) of the coupling part 11c of the propeller 11 is integrally attached by being press-fitted into or adhered to the through-hole 10h.

The rotation shaft 10 is rotatably supported by a bearing 51 disposed at the lower side and the bearing 53 disposed at the upper side. The bearings 51 and 53 are fixed by press-fitting inner rings 51n and 53n of the bearings 51 and 53 with respect to a surface 10g at the outer peripheral side of the rotation shaft 10 (hereinafter, this surface is referred to as "outer peripheral surface") in the radial direction. The bearings 51 and 53 may be integrally fixed with an adhesive or the like in a state of being fitted onto the rotation shaft 10 as needed.

The bearings 51 and 53 are, for example, ball bearings. However, the bearings 51 and 53 are not limited to ball bearings, and other various bearings such as a sleeve bearing may be used, for example. The bearings 51 and 53 are provided at the holder 30 to be described below and are supported by the holder 30.

In the motor 1, the rotor 20 is fixed to the outer peripheral surface 10g of the rotation shaft 10. The rotor 20 is constituted by a yoke 21 and a magnet Mg.

The yoke 21 is an annular member extending upward and downward along the axis X and is fitted against the outer peripheral surface 10g of the rotation shaft 10. The yoke 21 includes a tubular part 211 at the inner side disposed at the rotation shaft 10 side (hereinafter, this tubular part is referred to as "inner-side tubular part") in the radial direction, a tubular part 212 at the outer side disposed at the stator 40 side (hereinafter, this tubular part is referred to as "outer-side tubular part") in the radial direction, and an annular-shaped connection part 213 connecting the inner-side tubular part 211 and the outer-side tubular part 212 in the radial direction.

The magnet Mg is integrally attached to an outer peripheral surface 212g of the outer-side tubular part 212 of the yoke 21 by bonding or the like. The outer-side tubular part 212 of the yoke 21 and the magnet Mg have the same thickness in the axial direction. The yoke 21 is an iron core formed by a magnetic body such as iron.

The magnet Mg is an integral molding object of a magnetic body and is divided into a region magnetized to the south pole and a region magnetized to the north pole so as to be alternately disposed along the circumferential direction. The magnet Mg is fixed to the outer peripheral surface 212g of the yoke 21 by bonding or the like, but is not limited to being fixed by bonding or the like and may be fixed by press-fitting or the like.

The holder 30 is a member configured to support the bearing 51 disposed at the lower side and the bearing 53 disposed at the upper side, and formed of a metal material such as an aluminum alloy. The holder 30 is formed of a tubular member disposed at the lower side (hereinafter referred to as a "lower-side tubular member") 31, and a tubular member disposed at the upper side (hereinafter referred to as an "upper-side tubular member") 33, so as to have a structure divided into a plurality of (two in the present embodiment) sections. The lower-side tubular member 31 and the upper-side tubular member 33 are disposed at the rotor 20 side at the inner side of a resin member 410 described below in the radial direction.

The lower-side tubular member 31 supports the bearing 51 at the lower side. The upper-side tubular member 33 supports the bearing 53 at the upper side. Both the lower-side tubular member 31 and the upper-side tubular member 33 are disposed at the same axis, taking the axis X as the center axis.

As illustrated in FIG. 4, the lower-side tubular member 31 is formed of an inner-side tubular part 311 disposed at the inner side in the radial direction, an outer-side tubular part 312 disposed at the outer side in the radial direction, and a plurality of (for example, four) spokes 313 serving as a coupling part for connection between the inner-side tubular part 311 and the outer-side tubular part 312 in the radial direction.

A plurality of recess parts 313h (FIG. 3) are formed in the spokes 313 of the lower-side tubular member 31. The recess part 313h of the spoke 313 is a part to be attached with a main body of a drone (not illustrated), and includes a recess to be inserted with fasteners such as a bolt and a screw.

A stepped part 311d (FIGS. 3 and 4) is formed at a surface 311n on the inner peripheral side in the radial direction (hereinafter, this surface is referred to as "inner peripheral surface") in the inner-side tubular part 311 of the lower-side tubular member 31, and the bearing 51 at the lower side is attached to the stepped part 311d.

In this case, the lower-side bearing 51 is mounted at the stepped part 311d and is fixed to the inner peripheral surface 311n of the inner-side tubular part 311 by press-fitting, bonding, or the like. A disk-shaped lid part 311c is formed integrally at the bottom of the inner-side tubular part 311 to prevent dust, foreign matter, and the like from entering from the lower side. Note that an end part at the lower side of the rotation shaft 10 is separated from the lid part 311c of the lower-side tubular member 31 by a predetermined gap and is supported by the bearings 51 and 53.

The outer-side tubular part 312 of the lower-side tubular member 31 is formed longer in size in the axial direction than the inner-side tubular part 311. Two groove parts 312m recessed inward in the radial direction are formed at the inner side of an outer peripheral surface 312g of the outer-side tubular part 312. The groove parts 312m are concave-shaped grooves each having a predetermined depth in the radial direction, and having a predetermined width in the axial direction. The groove parts 312m are formed in two rows in parallel at a predetermined interval in the axial direction. These groove parts 312m are formed in an annular shape with respect to the outer peripheral surface 312g of the outer-side tubular part 312.

The upper-side tubular member 33 is configured by integrating a tubular part 331 and an upper lid part 332. The outer peripheral part and the inner peripheral part of the tubular part 331 of the upper-side tubular member 33 have the same dimensions as the outer peripheral part and the inner peripheral part of the outer-side tubular part 312 of the lower-side tubular member 31, and are arranged on the same axis as the axis of the lower-side tubular member 31.

Two groove parts 331m recessed inward in the radial direction are formed at an outer peripheral surface 331g of the tubular part 331. The groove parts 331m are concave-shaped grooves each having a predetermined depth in the radial direction and having a predetermined width in the axial direction, and are formed in two rows in parallel at a predetermined interval in the axial direction. These groove parts 331m are formed in an annular shape with respect to the outer peripheral surface 331g of the tubular part 331.

The two groove parts 331m formed in the tubular part 331 of the upper-side tubular member 33, and the two groove parts 312m formed in the outer-side tubular part 312 of the lower-side tubular member 31 are both concave-shaped grooves having the same shape and the same size. These groove parts 312m and 331m do not necessarily have to be two, and may be one or more than two. The groove parts 312m and 331m do not necessarily have to be annular, and may be formed by an aggregate of a plurality of groove parts intermittently interrupted in the circumferential direction.

A stepped part 331d is formed at the upper surface of the tubular part 331 of the upper-side tubular member 33. The stepped part 331d of the tubular part 331 is formed at the side of an inner peripheral surface 331n of the tubular part 331. The upper lid part 332 is fitted with respect to the stepped part 331d of the tubular part 331.

In the upper lid part 332 of the upper-side tubular member 33, there are integrated a part 332a having an annular shape, a tube 332b extending from an end part at the inner peripheral side of the part 332a toward the upper side along the axial direction to support the bearing 51, and a flange 332c having an annular shape and extending from an end part at the upper side of the tube 332b toward the inner peripheral side to engage with the bearing 51. In the upper lid part 332, the annular-shaped part 332a, the tube 332b, and the annular-shaped flange 332c constitute a support part configured to support the bearing 51.

An end part at the outer peripheral side of the annular-shaped part 332a is disposed at the stepped part 331d of the tubular part 331, so that the annular-shaped part 332a is integrated with the tubular part 331. The flange 332c is engaged with an outer ring 53g of the bearing 53, but is not limited to this configuration, and may extend to a position opposing the inner ring 53n of the bearing 53.

The stator 40 is provided between the lower-side tubular member 31 and the upper-side tubular member 33. The stator 40 includes a stator core 401, an insulator 402, a plurality of coils 406, and the resin member 410. The resin member 410 covers the stator core 401, the insulator 402, and the plurality of coils 406, and enters into between the windings of the coils 406.

As illustrated in FIG. 5, the stator core 401 is an electro-magnetic steel plate obtained by laminating silicon steel sheets as a magnetic body, or the like. Note that; however, the stator core 401 may be a non-magnetic body, a resin, or the like. The stator core 401 includes an annular part 4011 and a plurality of tooth parts 4012 each extending from the annular part 4011 toward the rotor 20 side. An end part 4013 at the rotor 20 side of the tooth part 4012 is a magnetic pole unit.

The end part 4013 of the stator core 401 includes projecting parts respectively projecting in the clockwise direction (arrow e direction) and the counterclockwise direction (arrow f direction), in the circumferential direction.

The end part (inner peripheral part) 4013 of the stator core 401 is disposed at the outer-side tubular part 312 in the lower-side tubular member 31 (FIG. 3). The tubular part 331 of the upper-side tubular member 33 is disposed at the end part 4013 of the stator core 401 (FIG. 3).

In other words, the end part 4013 of the stator core 401 is sandwiched between the outer-side tubular part 312 of the lower-side tubular member 31 and the tubular part 331 of the upper-side tubular member 33 in the holder 30, and is integrally formed by bonding or the like. In this case, the holder 30 forms a part of the stator 40, and the holder 30 is disposed at the rotor 20 side relative to the resin member 410.

In this case, a diameter d3 (FIG. 5) of a circle passing through an inner peripheral surface 4013n of the end part 4013 of the stator core 401 is the same as a diameter d1 (FIG. 4) of a circle passing through an inner peripheral surface 312n of the outer-side tubular part 312 of the lower-side tubular member 31, and a diameter d2 (FIG. 4) of a circle passing through the inner peripheral surface 331n of the tubular part 331 of the upper-side tubular member 33. That is, the inner peripheral surface 4013n of the end part 4013, the inner peripheral surface 312n of the outer-side tubular part 312 of the lower-side tubular member 31, and the inner peripheral surface 331n of the tubular part 331 of the upper-side tubular member 33 are flush with each other in the axial direction.

As illustrated in FIG. 6, the insulator 402 formed of an insulating member is mounted at the tooth part 4012 of the stator core 401, and the coil 406 is wound around the tooth part 4012 via the insulator 402.

In the stator core 401, the plurality of coils 406 of the same number of pieces of the tooth parts 4012 are disposed side by side in the circumferential direction. A resin film having an insulating property may be formed at a surface of the stator core 401, and the resin film may be used as the insulator.

An air gap (magnetic gap) g1 is formed between the inner peripheral surface 4013n of the end part 4013 of the stator core 401 and an outer peripheral surface of the magnet Mg fixed to the outer peripheral surface 212g of the outer-side tubular part 212 of the yoke 21.

In this case, as illustrated in FIG. 7, there is formed a space SP1 closed by the lower-side tubular member 31, the upper-side tubular member 33, the stator core 401, the rotation shaft 10, and the bearings 51, 53. In this closed space SP1, the rotor 20 and the air gap g1 formed between the rotor 20 and the stator 40 are disposed. In FIG. 7, the rotor 20 (the yoke 21 and magnet Mg) is not illustrated in order to make the closed space SP1 easy to be recognized.

As illustrated in FIG. 3, the resin member 410 of the stator 40 covers the stator core 401, the insulator 402, and the coil 406 from upward and downward directions and forms a member having an annular shape (cylindrical shape) as a whole. The resin member 410 contains, for example, an inorganic material having thermal conductivity such as alumina, and an epoxy-based resin material.

The stator 40 is molded using the resin member 410 in such a manner that the mold resin enters, during the injection molding, into the two groove parts 312m formed at the outer peripheral surface 312g of the outer-side tubular part 312 of the lower-side tubular member 31, and into the two groove parts 331m formed at the outer peripheral surface 331g of the tubular part 331 of the upper-side tubular member 33.

The resin member 410 is coupled to the lower-side tubular member 31 and the upper-side tubular member 33 including the groove parts 312m and 331m, respectively. Specifically, a part of the resin member 410 enters into the groove parts 312m and 331m. Thus, in the axial direction, the lower-side tubular member 31 and the upper-side tubular member 33 including the groove parts 312m and 331m, respectively, make it difficult for the resin member 410 to move in the upward and downward directions.

Furthermore, a part of the resin member 410 enters into the gap between the windings (copper wire) of the coil 406. As a result, the resin member 410 and the coil 406 are integrated in a tight state without gaps. That is, the heat generated in the coil 406 is easily transferred to the resin member 410.

In the axial direction, the resin member 410 covers the stator core 401, the insulator 402, and the coil 406 from the upward and downward directions. That is, a part of the resin member 410 enters into the gap between the windings, and another part of the resin member 410 forms side surfaces (inner-side surface, outer-side surface, upper-side surface, lower-side surface) of the overall stator 40. This makes it possible to protect the stator 40 from the outside, in particular, the upper side and the downward side. In this manner, the other part of the resin member 410 forms a part of the side surfaces of the stator 40.

In this case, in the motor 1, the part of the stator 40 including the coil 406 is covered with the resin member 410 having a relatively high heat dissipation efficiency, and the resin member 410 is arranged to be exposed to the outside and to oppose the blades 11a and 11b of the propeller 11. Thus, a wind generated by the blades 11a and 11b of the propeller 11 may hit and cool the resin member 410 to further cool the stator 40. In the motor 1, the upper side and the lower side of the coil 406 may be partially exposed by the resin member 410.

The motor 1 includes, as described above, the closed space SP1 formed by the rotation shaft 10, the upper-side bearing 53, the lower-side tubular member 31, the upper-side tubular member 33, and the resin member 410. The closed space SP1 is divided into two spaces by the rotor 20 (connection part 213). This makes it possible to prevent dust, foreign matter, and the like from entering into the air gap g1 disposed at the closed space SP1 of the motor 1. The closed space SP1 is not limited to this form, and may be formed by the rotation shaft 10, the lower-side bearing 51, the lower-side tubular member 31, the upper-side tubular member 33, and the resin member 410. In this case, an opening is formed in the lower-side tubular member 31, the rotation shaft 10 protrudes from the opening, and a lid part is provided at the upper-side tubular member 33 to oppose an end part at the upper-side tubular member 33 side of the rotation shaft 10.

A heat sink 60 is attached to an outer peripheral surface 4011g of the stator 40. The heat sink 60 is an annular-shaped member made of metal such as an aluminum alloy. The heat sink 60 is fixed to the outer peripheral surface 4011g of the annular part 4011 of the stator core 401 and to an outer peripheral surface 410ag of an upper-side part 410a of the resin member 410. The heat sink 60 may extend to a surface at the upper side (hereinafter, this surface is referred to as an "upper-side surface") 410u of the resin member 410. The side surfaces refer to a concept including a surface at the upper side (upper-side surface), a surface at the lower side (lower-side surface), an outer peripheral surface (outer-side surface), and an inner peripheral surface (inner-side surface).

The heat sink 60 includes a tubular part 61 and a plurality of fins 62 extending radially toward the outer side from the outer peripheral surface of the tubular part 61. The tubular part 61 extends to a degree of height to be flush with the upper-side surface 410u of the resin member 410. The fin 62 has substantially the same height as the annular part 4011 of the stator core 401. The fin 62 may have a degree of height to reach the upper-side surface 410u of the resin member 410, or a degree of height exceeding the upper-side surface 410u.

The tubular part 61 of the heat sink 60 is in contact with the outer peripheral surface 410ag of the upper-side part 410a of the resin member 410. In other words, the heat sink 60 is provided at the resin member 410 of the stator 40. Thus, the heat sink 60 may easily transfer heat generated in the coil 406 from the upper-side part 410a of the resin member 410 to the fin 62, and then the heat may be dissipated from the fin 62.

Because the fin 62 of the heat sink 60 is in contact with the outer peripheral surface 4011g of the annular part 4011 of the stator core 401, the heat generated in the coil 406 may be transferred directly from the annular part 4011 of the stator core 401 to the fin 62, and the heat may be easily dissipated from the fin 62.

As discussed above, in the motor 1, the covering is made from the upward and downward directions by the resin member 410 having a relatively high heat dissipation efficiency, and the resin member 410 is arranged to oppose the blades 11a and 11b of the propeller 11 in a state of being exposed to the outside.

As a result, the motor 1 may directly transfer the heat generated in the coil 406 to the resin member 410 and efficiently dissipate the heat from the resin member 410 to the outside. Furthermore, in the motor 1, the wind generated by the blades 11a and 11b of the propeller 11 may hit and cool the resin member 410, and thus the coil 406 may be efficiently cooled.

Since the motor 1 is provided with the heat sink 60 at the outer peripheral side of the resin member 410, the cooling of the resin member 410 may also be promoted by the fins 62 of the heat sink 60 in addition to the cooling of the resin member 410 by the wind of the propeller 11.

In the motor 1, the air gap (magnetic gap) g1 between the magnet Mg of the rotor 20 and the end part 4013 of the stator core 401 is disposed at the inside of the closed space SP1. This makes it possible for the motor 1 to prevent dust, foreign matter, and the like from entering into the closed space SP1, and prevent the foreign matter from entering into the air gap g1. Thus, the risk of breakage or failure of the motor 1 may be reduced.

According to the configuration described above, with the motor 1, the coil 406 may be cooled via the resin member 410, and the efficiency of the motor may be improved.

Other Embodiments

As described above, the motor according to the present invention has been described with reference to a preferred embodiment, but the motor according to the present invention is not limited to the configuration of the embodiment described above. For example, although the motor 1 according to the present embodiment is configured as an inner rotor type brushless motor, the present invention may also be applied to motors other than a brushless motor. The present invention may also be applied to an outer rotor type motor. In the case of an outer rotor type motor, the stator is disposed at the inner side of the rotor. For example, a heat sink may be provided at the outer peripheral surface of the rotor.

In the present embodiment, the case of the heat sink 60 being fixed to the stator 40 is described, but the present invention is not limited to this case and may be applied to a case of no heat sink 60 being provided.

In addition, those skilled in the art may appropriately modify the motor of the present invention, may change the combinations of the constituent elements, and may remove unnecessary constituent elements based on the usage in accordance with conventionally known knowledge. Such modifications are of course included in the scope of the present invention as long as these modifications still include the configuration of the present invention.

REFERENCE SIGNS LIST

1 Motor
10 Rotation shaft
11 Propeller
20 Rotor
21 Yoke
211 Inner-side tubular part
212 Outer-side tubular part
213 Connection part
Mg Magnet
30 Holder
31 Lower-side tubular member
311 Inner-side tubular part
312 Outer-side tubular part
312m Groove part
313 Spoke serving as coupling part
33 Upper-side tubular member
331 Tubular part
331m Groove part
332 Upper lid part
40 Stator
401 Stator core
4011 Annular part
4012 Tooth part
4013 End part
402 Insulator
406 Coil
410 Resin member
410a Upper-side part
51, 53 Bearing
g1 Air gap (Magnetic gap)
SP1 Closed space

The invention claimed is:

1. A motor comprising:
a rotation shaft;
a blade provided at the rotation shaft;
a holder including a tubular member;
a rotor; and
a stator facing the rotor in a radial direction of the rotor, wherein
the stator is fixed to the tubular member,
the stator includes a magnetic body, a coil, and a resin member,
a part of the resin member enters into between windings of the coil,
another part of the resin member forms a side surface of the stator, and
another part of the resin member face the blade in an axial direction of the rotation shaft,
the resin member is arranged to be exposed to the outside of the holder in a radial direction, a heat sink is attached to a side surface of the stator in a radial direction, the heat sink includes a plurality of fins extending toward an outer side of the motor.

2. The motor according to claim 1, wherein another part of the resin member forms a side surface at the blade side of the stator.

3. The motor according to claim 1, wherein the rotor is located at the rotation shaft side relative to the stator in a radial direction.

4. The motor according to claim 1, wherein the tubular member is located at the rotor side relative to the resin member in the radial direction.

5. The motor according to claim 1, wherein
the stator includes a plurality of the coils including the above-mentioned coil,
the plurality of coils are arranged side by side in a circumferential direction,
the resin member has an annular shape covering the plurality of coils, and
the tubular member is located at the rotor side at an inner side of the resin member in the radial direction.

6. The motor according to claim 1, wherein
the tubular member is provided with a bearing configured to support the rotation shaft,
a closed space is formed by the tubular member, the bearing, and the magnetic body, and
the rotor and a magnetic gap formed between the rotor and the magnetic body are located at the closed space.

7. The motor according to claim 1, wherein a heat sink is provided at the resin member.

8. The motor according to claim 3, wherein another part of the resin member forms a part of an outer-side surface of the stator.

9. The motor according to claim 8, wherein the holder forms a part of the stator, and is located at the rotor side relative to the resin member in the radial direction.

* * * * *